No. 893,735.
PATENTED JULY 21, 1908.
R. JONES.
HAY, STRAW, OR LIKE CUTTING KNIFE.
APPLICATION FILED MAR. 17, 1906.
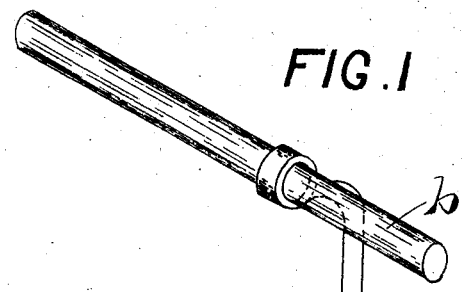
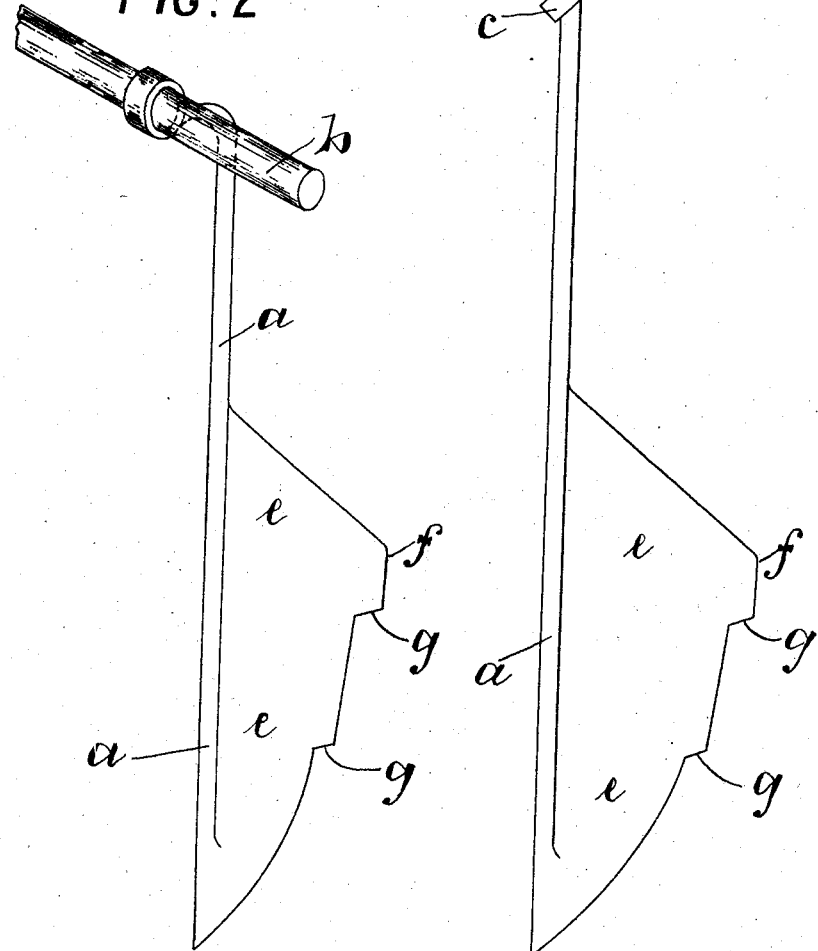
WITNESSES
W. P. Burke
W. J. O'Donovan
INVENTOR
Richard Jones
BY
Richard
ATTYS

UNITED STATES PATENT OFFICE.

RICHARD JONES, OF PENMAENMAWR, ENGLAND.

HAY, STRAW, OR LIKE CUTTING KNIFE.

No. 893,735.  Specification of Letters Patent.  Patented July 21, 1908.

Application filed March 17, 1906. Serial No. 306,627.

*To all whom it may concern:*

Be it known that I, RICHARD JONES, a subject of the King of England, residing at Penmaenmawr, Carnarvonshire, North Wales, England, have invented new and useful Improvements in Hay, Straw, or Like Cutting Knives, of which the following is a specification.

This invention has reference to hand knives for cutting hay, straw, or the like, in the stack; and the invention has primarily for its object and effect, to provide an improved knife, by which it can be used, and the hay or straw cut, with less labor, and at a more rapid rate; and at the same time, among other things, to provide a light and strong tool.

The invention is illustrated in the accompanying drawings, in which Figures 1 and 2 are side elevations, showing knives of different sizes according to the invention; and Fig. 3 is a plan in section of a knife.

The invention will be described with the aid of these drawings.

In the drawings $a$ generally designates the shank of the knife; and $e$ the blade. The shank $a$, which say is of steel, may be of about half an inch square—this being sufficient; and from the tip of the blade to the handle or top of the shank, in the larger knives, it may be about three feet, while in smaller ones, it may be about two feet. The blade $e$ is disposed at the base or lower end of the shank $a$, and may be secured in it in any known suitable way. The blade is inclined from the bottom, beginning at a sharp point there, and extends outwards towards its upper part, at a relatively quick inclination.

I have found that the depth of blade between the point, and the upper angle $f$, which is the end of the cutting part, may be conveniently about 12 inches; while the width from the shank to the upper edge $f$ in the horizontal plane, may be about 6 inches in the larger knives, and about 5 inches in the smaller ones. Between the lower tip or point, and the widest point of the cutting edge—the point $f$—it has two portions $g$, slightly upwardly inclined, and forming cutting teeth, and giving the knife a general irregular cutting edge. Instead of two projecting parts $g$, there may be only one. The portion of the edge between these outward teeth or projecting parts $g$, is also inclined outwards as it extends upward. Thus the whole edge from the sharp point at the bottom, to the uppermost angle or point $f$ is a cutting edge. The first outward projection $g$ is about half the vertical height between the tip or point of the blade, and the point $f$. Between this point $f$ and the shank, the blade extends full back towards the shank, at a sharp angle.

The relative proportions and positions of the different parts of the cutting edge of the blade shown in the drawings, give very satisfactory results; but the invention is not restricted to the exact dimensions given.

The handle $b$ is parallel with the plane of the blade, and projects onto one side of the shank; and on the side opposite the blade, it may be longer than the other side, that is, on one side, the handle is short, and on the other, relatively long, as shown in the drawings.

The longer knife herein described is adapted mainly to be used for cutting when in a standing position; and the shorter one is for cutting when on the knees. Further, according to this invention, in some cases, as shown in Fig. 1, there is employed a sliding sleeve device $c$, adapted to move up and down on the shank, and having an angular projecting part below, in the form of a short arm, as shown. The device or gage may be suitably adjusted and held in position, by a clamped screw $c^1$, or in any other suitable way. By this means, the depth for cutting can be regulated and adjusted, as the device forms a stop when the knife is pressed down, and reaches the solid and uncut hay or material. Thus the depth of the truss can be gaged, and all cut exactly the same depth.

The knife according to this invention is lighter than the usual type of knife, and as stated, it can be used with less labor, and cuts more readily and rapidly; and it can be easily sharpened when blunt in the usual way, that is, with the usual sharpening stone.

What is claimed is:—

A knife for the purpose described, having a blade with its point substantially in the axial line of the shank, the said blade having its cutting edge curving laterally from the point and longitudinally, the cutting edge intermediate of its length being provided with teeth whose cutting edges extend outwardly and upwardly at a slight angle to a line drawn at right angles to the shank and the upper part of the blade extending at an angle to the shank, and the blade tapering from the shank to the cutting edge substantially as described In testimony whereof I have signed my name to this specification in the presence of two subscribing witnesses.

RICHARD JONES.

Witnesses:
S. GOODALL,
W. HARRISON.